(12) United States Patent
Le Floch et al.

(10) Patent No.: US 9,866,872 B2
(45) Date of Patent: Jan. 9, 2018

(54) METHOD AND DEVICE FOR ERROR CONCEALMENT IN MOTION ESTIMATION OF VIDEO DATA

(75) Inventors: Hervé Le Floch, Rennes (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 1125 days.

(21) Appl. No.: 13/560,864

(22) Filed: Jul. 27, 2012

(65) Prior Publication Data

US 2013/0039424 A1   Feb. 14, 2013

(30) Foreign Application Priority Data

Jul. 29, 2011   (GB) .................................. 1113124.0

(51) Int. Cl.
*H04N 19/895* (2014.01)
*H04N 19/56* (2014.01)
*H04N 19/46* (2014.01)
*H04N 19/96* (2014.01)

(52) U.S. Cl.
CPC ........... *H04N 19/895* (2014.11); *H04N 19/46* (2014.11); *H04N 19/56* (2014.11); *H04N 19/96* (2014.11)

(58) Field of Classification Search
CPC combination set(s) only.
See application file for complete search history.

(56) References Cited

U.S. PATENT DOCUMENTS

| | | | | |
|---|---|---|---|---|
| 6,141,448 A | * | 10/2000 | Khansari | H04N 19/895 348/466 |
| 6,192,080 B1 | * | 2/2001 | Sun | H04N 19/577 348/404.1 |
| 6,636,565 B1 | * | 10/2003 | Kim | H04N 19/50 375/240.27 |

(Continued)

OTHER PUBLICATIONS

H. Nicolas and C. Labit, "Region-based motion estimation using deterministic relaxation schemes for image sequence coding," Acoustics, Speech, and Signal Processing, 1992. ICASSP-92., 1992 IEEE International Conference on, San Francisco, CA, 1992, pp. 265-268 vol. 3.*

(Continued)

*Primary Examiner* — Dave Czekaj
*Assistant Examiner* — Tyler W. Sullivan
(74) *Attorney, Agent, or Firm* — Canon USA, Inc. I.P. Division

(57) ABSTRACT

An encoder extracts motion vectors from a frame I(t-1) preceding the frame I(t) being encoded and processes them to create an estimated motion vector field I(t) for the frame being encoded. A minimized difference between the motion vector field of the frame being encoded and the estimated motion vector field is used to generate transform parameters, which are transmitted to the decoder as auxiliary information along with the usual motion prediction information. The decoder receives the transform parameters. The decoder also creates an estimated motion vector field I(t) for based on a preceding frame I(t-1) and applies the transform parameters to the estimated motion vector field to obtain missing motion (Continued)

vectors. The motion vector field rebuilt using the reconstructed missing motion vectors is used for subsequent error concealment/decoding/displaying.

4 Claims, 11 Drawing Sheets

(56) References Cited

U.S. PATENT DOCUMENTS

| | | | | |
|---|---|---|---|---|
| 6,766,037 | B1* | 7/2004 | Le | G06K 9/342 |
| | | | | 382/107 |
| 8,634,471 | B2* | 1/2014 | Endo | H04N 5/144 |
| | | | | 375/240.16 |
| 8,897,364 | B2* | 11/2014 | Le Floch | H04N 19/50 |
| | | | | 375/240.15 |
| 2005/0152452 | A1* | 7/2005 | Suzuki | H04N 19/176 |
| | | | | 375/240.16 |
| 2005/0231644 | A1* | 10/2005 | Salzer | G06T 3/4007 |
| | | | | 348/701 |
| 2006/0072662 | A1* | 4/2006 | Tourapis | H04N 19/00684 |
| | | | | 375/240.12 |
| 2006/0193388 | A1* | 8/2006 | Woods | H04N 19/647 |
| | | | | 375/240.16 |
| 2007/0014359 | A1* | 1/2007 | Gomila | H04N 19/51 |
| | | | | 375/240.16 |
| 2007/0064805 | A1* | 3/2007 | Carrig | H04N 19/567 |
| | | | | 375/240.16 |
| 2008/0049845 | A1* | 2/2008 | Liu | H04N 19/176 |
| | | | | 375/240.27 |
| 2008/0247462 | A1* | 10/2008 | Demos | H04N 19/597 |
| | | | | 375/240.03 |
| 2009/0138773 | A1 | 5/2009 | Henocq et al. | |
| 2009/0207915 | A1* | 8/2009 | Yan | H04N 19/53 |
| | | | | 375/240.16 |
| 2009/0232214 | A1* | 9/2009 | Ghanbari | H04N 19/577 |
| | | | | 375/240.16 |
| 2010/0128791 | A1* | 5/2010 | Le Floch | H04N 19/139 |
| | | | | 375/240.16 |
| 2010/0195736 | A1* | 8/2010 | Haseyama | H04N 19/51 |
| | | | | 375/240.16 |
| 2010/0303154 | A1 | 12/2010 | Le Floch et al. | |
| 2010/0309982 | A1 | 12/2010 | Le Floch et al. | |
| 2012/0008690 | A1* | 1/2012 | Lee | H04N 19/105 |
| | | | | 375/240.16 |
| 2012/0128071 | A1* | 5/2012 | Celetto | H04N 7/68 |
| | | | | 375/240.16 |
| 2012/0148111 | A1* | 6/2012 | Chen | H04N 7/0137 |
| | | | | 382/107 |
| 2012/0230405 | A1* | 9/2012 | An | H04N 19/105 |
| | | | | 375/240.13 |
| 2013/0028325 | A1* | 1/2013 | Le Floch | H04N 19/56 |
| | | | | 375/240.16 |

OTHER PUBLICATIONS

Yeping Su, Ming-Ting Sun and V. Hsu, "Global motion estimation from coarsely sampled motion vector field and the applications," in IEEE Transactions on Circuits and Systems for Video Technology, vol. 15, No. 2, pp. 232-242, Feb. 2005. doi: 10.1109/TCSVT.2004.841656 URL: http://ieeexplore.ieee.org/stamp/stamp.jsp?tp=&arnumber=1390998&isnumber=30287.*

Yeping Su, Ming-Ting Sun and V. Hsu, "Global motion estimation from coarsely sampled motion vector field and the applications," Circuits and Systems, 2003. ISCAS '03. Proceedings of the 2003 International Symposium on, 2003, pp. II-628-II-631 vol. 2. doi: 10.1109/ISCAS.2003.1206052 URL: http://ieeexplore.ieee.org/stamp/stamp.jsp?tp=&arnumber=1206052.*

Baccichet Pierpaolo, et al., "Systematic lossy error protection based on H.264/AVC redundant slices and flexible macroblock ordering*", Journal of Zhejiang University Science A,ISSN 1009-3095 (Print); ISSN 1862-1775 (Online) www.zju.edu.cn/jzus; www.springerlink.com, 2006 7(5): 900-909.

* cited by examiner

METHOD AND DEVICE FOR ERROR CONCEALMENT IN MOTION ESTIMATION OF VIDEO DATA

CROSS-REFERENCE TO RELATED APPLICATIONS

This application claims the benefit under 35 U.S.C. §119(a)-(d) of UK Patent Application No. 1113124.0, filed on Jul. 29, 2011 and entitled "Method and Device for Error Concealment in Motion Estimation of Video Data".

The above cited patent application is incorporated herein by reference in its entirety.

FIELD OF THE INVENTION

The present invention relates to video data encoding and decoding. In particular, the present invention relates to video encoding and decoding using an encoder and a decoder such as those that use the H.264/AVC standard encoding and decoding methods. The present invention focuses on error concealment based on motion information in the case of part of the video data being lost between the encoding and decoding processes.

The present invention also relates to transcoding where a transcoder, in contrast to an encoder, does not necessarily perform encoding, but receives, as an input, an encoded bitstream (e.g. from an encoder) and outputs a modified encoded bitstream, for example, including auxiliary information.

H.264/AVC (Advanced Video Coding) is a standard for video compression that provides good video quality at a relatively low bit rate. It is a block-oriented compression standard using motion-compensation algorithms. By block-oriented, what is meant is that the compression is carried out on video data that has effectively been divided into blocks, where a plurality of blocks usually makes up a video frame (also known as a video picture). Processing frames block-by-block is generally more efficient than processing frames pixel-by-pixel and block size may be changed depending on the precision of the processing. A large block (or a block that contains several other blocks) may be known as a macroblock and may, for example, be 16 by 16 pixels in size. The compression method uses algorithms to describe video data in terms of a movement or translation of video data from a reference frame to a current frame (i.e. for motion compensation within the video data). This is known as "inter-coding" because of the inter-image comparison between blocks. The following steps illustrate the main steps of the 'inter-coding' applied to the current frame at the encoder side. In this case, the comparison between blocks gives rise to information (i.e. a prediction) regarding how an image in the frame has moved and the relative movement plus a quantized prediction error are encoded and transmitted to the decoder. Thus, the present type of inter-coding is known as "motion prediction encoding".

1. A current frame is to be a "predicted frame". Each block of this predicted frame is compared with a reference areas in a reference frame to give rise to a motion vector for each predicted block pointing back to a reference area. The set of motion vectors for the predicted frame obtained by this motion estimation gives rise to a motion vector field. This motion vector field is then entropy encoded.

2. The current frame is then predicted from the reference frame and the difference signal for each predicted block with respect to its reference area (pointed to by the relevant motion vector) is calculated. This difference signal is known as a "residual". The residual representing the current block then undergo a transform such as a discrete cosine transform (DCT), quantisation and entropy encoding before being transmitted to the decoder.

Defining a current block by way of a motion vector from a reference area (i.e. by way of temporal prediction) will, in many cases, use less data than intra-coding the current block completely without the use of motion prediction. In the case of intra-coding a current block, that block is intra-predicted (predicted from pixels in the neighbourhood of the block), DCT transformed, quantized and entropy encoded. Generally, this occurs in a loop so that each block undergoes each step above individually, rather than in batches of blocks, for instance. With a lack of motion prediction, more information is transmitted to the decoder for intra-encoded blocks than for inter-coded blocks.

Returning to inter-coding, a step which has a bearing on the efficiency and efficacy of the motion prediction is the partitioning of the predicted frame into blocks. Typically, macroblock-sized blocks are used. However, a further partitioning step is possible, which divides macroblocks into rectangular partitions with different sizes. This has the aim of optimising the prediction of the data in each macroblock. These rectangular partitions each undergo a motion-compensated temporal prediction.

The inter-coded and intra-coded partitions are then sent as an encoded bitstream through a communication channel to a decoder.

At the decoder side, the inverse of the encoding processes is performed. Thus, the encoded blocks undergo entropy decoding, inverse quantisation and inverse DCT. If the blocks are intra-coded, this gives rise to the reconstructed video signal. If the blocks are inter-coded, after entropy decoding, both the motion vectors and the residuals are decoded. A motion compensation process is conducted using the motion vectors to reconstruct an estimated version of the blocks. The reconstructed residual is added to the estimated reconstructed block to give rise to the final version of the reconstructed block.

Sometimes, for example, if the communication channel is unreliable, packets being sent over the channel may be corrupted or even lost. To deal with this problem at the decoder end, error concealment methods are known which help to rebuild the image blocks corresponding to the lost packets.

There are two main types of error concealment: spatial error concealment and temporal error concealment.

Spatial error concealment uses data from the same frame to reconstruct the content of lost blocks from that frame. For example, the available data is decoded and the lost area is reconstructed by luminance and chrominance interpolation from the successfully decoded data in the spatial neighbourhood of the lost area. Spatial error concealment is generally used in a case in which it is known that motion or luminance correlation between the predicted frame and the previous frame is low, for example, in the case of a scene change. The main problems with spatial error concealment is that the reconstructed areas are blurred because the interpolation can be considered to be equivalent to a kind of low-pass filtering of the image signal of the spatial neighbourhood; and this method does not deal well with a case in which several blocks—or even a whole slice—are lost.

Temporal error concealment—such as that described in US 2009/0138773, US 2010/0309982 or US 2010/0303154—reconstructs a field of motion vectors from the data available and then applies a reconstructed motion vector corresponding to a lost block in a predicted frame in such a way as to enable prediction of the luminance and the chrominance of the lost block from the luminance and chrominance of the corresponding reference area in the reference frame. For example, if the motion vector of a predicted block in a current predicted frame has been corrupted, a motion vector can be computed from the motion vectors of the blocks located in the spatial neighbourhood of the predicted block. This computed motion vector is then used to recognise a candidate reference area from which the luminance of the lost block of the predicted frame can be estimated. Temporal error concealment works if there is sufficient correlation between the current frame and the previous frame (used as the reference frame), for example, when there is no change of scene.

However, temporal error concealment is not always effective when several blocks or even full slices are corrupted or lost.

It is desirable to improve the motion reconstruction process in video error concealment while maintaining a high coding/decoding speed and high compression efficacy. Specifically, it is desirable to improve the block reconstruction quality while transmitting a very low quantity of auxiliary information and limiting delay in transmission.

Video data that is transmitted between a server (acting as an encoder or a transcoder) and at least one client (acting as a decoder) over a packet network is subject to packet losses (i.e. losses of packets that contain the elementary video data stream corresponding to frame blocks). For example, the network can be an internet protocol (IP) network carrying IP packets. The network can be a wired network and/or a wireless network. The network is subject to packet losses at several places within the network. Two kinds of packet losses exist:

Losses due to the congestion of the network. In such a case, the quantity of data sent is too high and at least one router of the network drops a percentage of the received packets.

Losses due to interference. As an example, these interferences can occur over a wireless network due to parasite microwaves.

For dealing with these losses, several solutions are possible. The first solution is the usage of a congestion control algorithm. If loss notifications are received by the server (i.e. notifications that packets are not being received by the client), it can decide to decrease its transmission rate, thus controlling congestion over the network. Congestion-control algorithms like TCP (Transmission Control Protocol) or TFRC (TCP Friendly Rate Control) implement this strategy. However, such protocols are not fully effective for dealing with congestion losses and are not at all effective for dealing with interference losses.

Other solutions are based on protection mechanisms.

Forward Error Code (FEC) protects transmitted packets (e.g. RFC 2733) by transmitting additional packets with the video data. However, these additional packets can take up a large proportion of the communication channel between the server and the client, risking further congestion. Nevertheless, FEC enables the reconstruction of a perfect bit-stream if the quantity of auxiliary information is sufficient.

Packet retransmission (e.g. RFC 793), as the name suggests, retransmits at least packets that are lost. This causes additional delay that can be unpleasant for the user (e.g. in the context of video conferencing, where a time lag is detrimental to the efficient interaction between conference attendees). The counterpart of this increased delay is a very good reconstruction quality.

The use of redundant slices (as discussed in "Systematic Lossy Error Protection based on H.264/AVC redundant slices and flexible macroblock ordering", Journal of Zhejiang University, University Press, co-published with Springer, ISSN1673-565X (Print) 1862-1775 (Online), Volume 7, No. 5, May 2006) requires the transmission of a high quantity of auxiliary information. Redundant slices often enable only an approximation of the lost part of the video data.

As mentioned above, spatial and temporal error concealment work well if only a very small number of packets are lost, and if the packets that are lost contain blocks that are not near each other either spatially or temporally respectively because it is the neighbouring blocks (in the spatial or temporal direction) that are used to rebuild the lost blocks.

Thus, none of the solutions proposed in the prior art enables the improvement of the block reconstruction quality while transmitting a very low quantity of auxiliary information and limiting delay in transmission.

It is thus proposed to improve the quality of the lost blocks of the video (using error concealment algorithms) while transmitting little auxiliary information. This will be described below with reference to the figures.

SUMMARY OF THE INVENTION

According to a first aspect of the invention, there is provided an encoder for encoding a first frame I(t) of a video bitstream, each frame of the video bitstream being defined by a plurality of blocks of pixels, the encoder comprising: first determining means for determining a motion vector field of the first frame I(t); second determining means for determining a motion vector field of a second frame I(t−1) of the video bitstream; parameter-generating means for determining a transformation from the motion vector field of the first frame I(t) to the motion vector field of the second frame I(t−1), and for generating a parameter based on the determined difference; and transmission means for transmitting the generated parameter to a decoder. Rather than an encoder, a transcoder or other device may be used that creates the parameters, e.g., from previously-encoded data, to send to the decoder.

The determination of the transformation between the motion vector field of the first frame I(t) and the motion vector field of the second frame I(t−1) is preferably done on a block-by-block basis. Of course, other frame divisions may be used to determine motion vectors and thereby to compare the motion vectors of different frames.

The parameter-generating means is preferably configured to minimise a difference between the motion vector field of the first frame I(t) and the motion vector field of the second frame I(t−1). This is how the parameter is generated.

When the transformation is determined between the first and second motion vector fields, the motion vector of the second frame is in fact preferably an estimated motion vector field of the first frame I(t) that is based on the motion vector field of the second frame I(t−1); and the parameter-generating means is preferably configured to determine a transformation between the motion vector field of the first frame I(t) and the estimated motion vector field of the first frame I(t) and to generate the parameter based on said transformation.

The second determining means preferably comprises: obtaining means for obtaining motion vectors for each of a plurality of blocks of the second frame I(t−1); inverting means for inverting the motion vectors for each of the plurality of blocks of the second frame I(t−1); associating means for associating blocks of the second frame I(t−1) with blocks of the first frame I(t) using the inverted motion vectors; and assigning means for assigning each respective motion vector for each block of the second frame I(t−1) to each respective block of the first frame I(t) with which the respective motion vector is associated by the associating means to generate an estimated motion vector field for the first frame I(t). This associating means preferably comprises: means for projecting each block from the second frame I(t−1) onto the first frame I(t) using the inverted motion vectors; and means for determining with which block of the first frame I(t) each projected block overlaps the most. The assigning means is thus preferably configured to assign each respective motion vector for each block of the second frame I(t−1) to each respective associated block in the first frame I(t) with which each respective projected block overlaps the most such that each block with which a projected block overlaps the most is assigned a motion vector. The assigning means preferably further comprises: means for interpolating a motion vector to any block in the first frame I(t) that does not have a motion vector assigned to it in order to generate an estimated motion vector field for all blocks of the first frame I(t).

A motion vector field is preferably determined for a frame by the extraction of a motion vector for each of a plurality of blocks of each respective frame.

The parameter is preferably a transformation parameter that defines a motion vector field of the first frame I(t) as a function of the motion vector field of the second frame I(t−1), or more specifically, as a function of an estimated motion vector field of the first frame that is based on the motion vectors of the second frame I(t−1). The parameter may be a polynomial function defining an extent of motion of the first frame I(t) with respect to the second frame I(t−1). The parameter may be determined by the parameter-generating means determining a difference between individual motion vectors of the first frame and individual, co-located motion vectors of the second frame.

Preferably, at least one of the first and second determining means is configured to extract an H.264 motion vector field. Alternatively, at least one of the first and second determining means may extract a motion extrapolation vector field.

The parameter-generating means may be configured to minimise a distance between the motion vector field of the first image I(t) and an estimated motion vector field of the first image based on the second image using at least one of a constant transformation and a linear transformation in order to obtain the parameter. This distance may be minimised using an $L_2$ norm or an $L_1$ norm in either constant transformation or linear transformation embodiments.

According to a second embodiment of the invention, there is provided a device for generating auxiliary information for recovering a motion vector field of at least part of a first frame I(t) of a video, the device comprising: first obtaining means for obtaining a motion vector field of a first frame I(t) of the video; second obtaining means for obtaining a motion vector field of a second frame I(t−1) of the video; estimating means for estimating the motion vector field of the at least part of the first frame I(t) based on the obtained motion vector field of the second frame I(t−1); parameter-generating means for generating a parameter based on the obtained motion vector field and the estimated motion vector field of the at least part of the first frame I(t); and transmission means for transmitting the generated parameter to a decoder as auxiliary information.

Preferably, the parameter-generating means comprises means for determining the parameter that, when applied to the estimated motion vector field, results in a recovered motion vector field that minimises the difference between the obtained motion vector field and the recovered motion vector field of the at least part of the first frame I(t). This device may be a transcoder or an encoder.

According to a third aspect of the invention, there is provided a device, such as a decoder, for recovering a motion vector field of an area of a first frame I(t) of a video, the decoder comprising: receiving means for receiving a parameter as auxiliary information, the parameter being based on the motion vector field of the first frame I(t) and an estimated motion vector field of at least part of the first frame I(t); obtaining means for obtaining a motion vector field of a second frame I(t−1) of the video; estimating means for estimating the motion vector field of the at least part of the first frame I(t) based on the obtained motion vector field of the second frame I(t−1); applying means for applying the received parameter to the estimated motion vector field to obtain a recovered motion vector field for at least According to a fourth aspect of the invention, there is provided a decoder for decoding a first frame I(t) of a video bitstream, each frame of the video bitstream comprising blocks of pixels, the decoder comprising: first receiving means for receiving information regarding any received motion vectors for the first frame I(t); first determining means for determining a location within the first frame I(t) of motion vectors of the first frame I(t) that have not been received by the first receiving means; second determining means for determining a motion vector field of a second frame I(t−1); second receiving means for receiving a parameter defining a transformation from a motion vector field of the first frame and a motion vector field of the second frame; and applying means for applying the received parameter to the motion vector field of the second frame at the location determined by the first determining means to obtain an estimate of a motion vector of the first frame that was not received.

Similarly to the encoder, the second determining means preferably determines an estimated motion vector field of the first frame I(t) based on the motion vector field of the second frame I(t−1); and the applying means preferably applies the received parameter to the estimated motion vector field of the first frame I(t).

The second determining means preferably comprises: means for obtaining motion vectors for each of a plurality of blocks of the second frame I(t−1); means for inverting the motion vectors for each of the plurality of blocks of the second frame I(t−1); associating means for associating blocks of the second frame I(t−1) with blocks of the first frame I(t) using the inverted motion vectors; and assigning means for assigning each respective motion vector for each block of the second frame I(t−1) to each respective block of the first frame I(t) with which the respective motion vector is associated by the associating means.

As in the encoder, the applying means preferably determines the parameter using at least one of a constant transformation and a linear transformation and preferably uses the $L_1$ or $L_2$ norm.

When blocks in the first frame I(t) are lost before reaching the decoder, the applying means preferably applies the received parameter only to locations of the motion vector field of the second frame corresponding to the lost blocks in the first frame.

According to a fifth aspect of the invention, there is provided an image processing system comprising an encoder, device or transcoder and a device or decoder as described above.

According to a sixth aspect of the invention, there is provided an encoding method of encoding a first frame I(t) of a video bitstream, each frame of the video bitstream being defined by a plurality of blocks of pixels, the method comprising: determining a motion vector field of the first frame I(t); determining an estimated motion vector field of the first frame I(t) based on a second frame I(t−1) of the video bitstream; determining a difference between the motion vector field of the first frame I(t) and the estimated motion vector field of the first frame I(t); and generating a parameter based on the determined difference; and transmitting the generated parameter to a decoder.

According to a seventh aspect of the invention, there is provided a decoding method of decoding a first frame I(t) of a video bitstream, each frame of the video bitstream comprising blocks of pixels, the method comprising: receiving information regarding any received motion vectors for the first frame I(t); determining a location within the first frame I(t) of motion vectors of the first frame I(t) that have not been received; determining an estimated motion vector field of the first frame I(t) based on a second frame I(t−1) of the video bitstream; receiving a parameter defining a transformation between a motion vector field of the first frame and the estimated motion vector field of the first frame I'(t); and applying the received parameter to the estimated motion vector field of the first frame I(t) at the determined location to obtain a motion vector of the first frame that was not received.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

BRIEF DESCRIPTION OF THE DRAWINGS

FIGS. 1 and 2 explain the context in which the present embodiments may be applied.

DETAILED DESCRIPTION OF THE PREFERRED EMBODIMENTS

Figure 1:
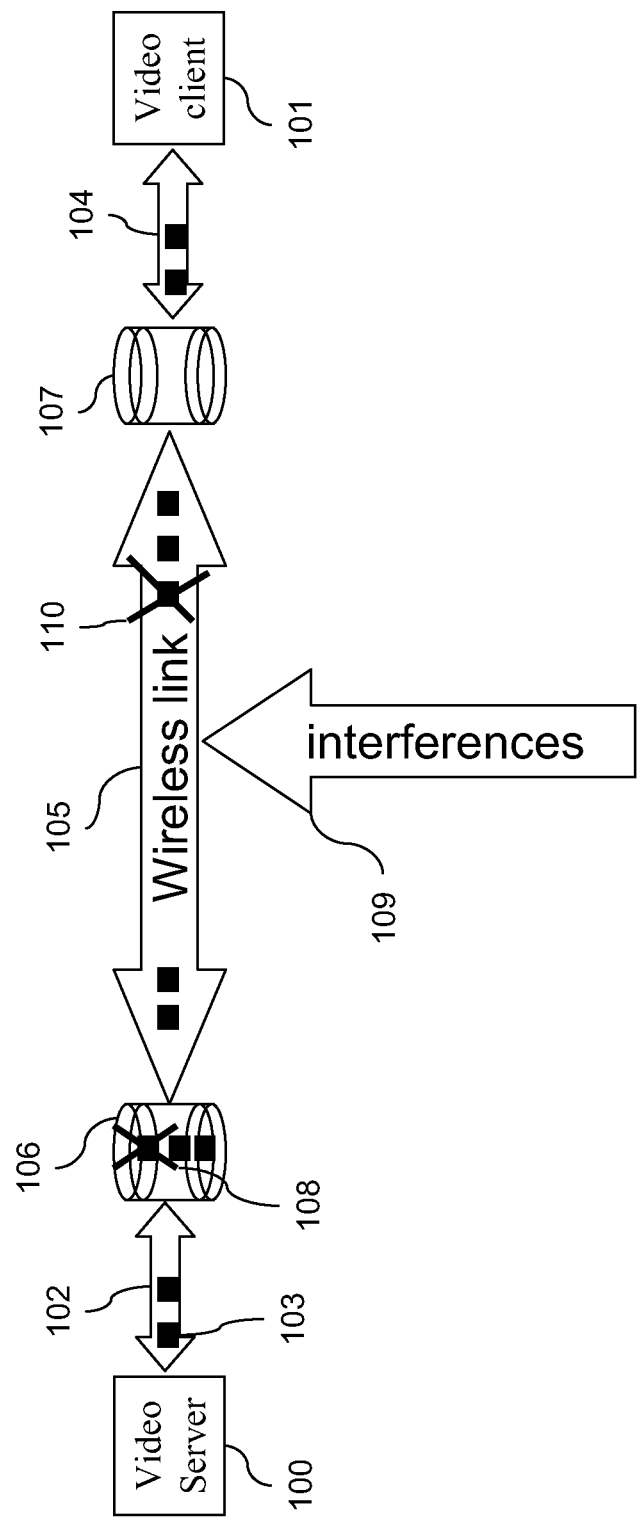
FIG. 1 depicts an overview of a video communication system usable with the present invention.

In FIG. 1, the role of the video server 100 is to transmit compressed video information. The compression algorithm can be MPEG-1, MPEG-2, H.264/AVC, etc. By way of example, the present specific description will refer to the properties of the H.264/AVC video standard.

The server 100 sends a video data bitstream in the form of IP/RTP packets 103 over a first network link 102. The compressed bitstream (elementary stream generated by the server) is split into sub-parts (slices). These slices are embedded as VCL NALU (Video Coding Layer Network Abstraction Layer Units) into the IP/RTP packets 103.

When a video bitstream is being manipulated (e.g. transmitted or encoded, etc.), it is useful to have a means of containing and identifying the data. To this end, a type of data container used for the manipulation of the video data is a unit called a Network Abstraction Layer Unit (NAL unit or NALU). A NALU—rather than being a physical division of the frame as the macroblocks described above are—is a syntax structure that contains bytes representing data. Different types of NALU may contain coded video data or information related to the video data. A set of successive NALUs that contributes to the decoding of one frame forms an Access Unit (AU).

Returning to FIG. 1, each NALU of the video bitstream is inserted as a payload into a real-time transport protocol (RTP) packet 103. The first network link 102 may be a wired or wireless network. In the case of a wired network, for example, the network links are usually connected with routers 106. A router is composed of a queue that stores the packets before resending them on another link in the network. In FIG. 1, the second link 105 may be a separate, wireless network. If the capacity of the second link 105 is lower than the capacity of the previous link 102 or if several links are connected to the router 106, some IP packets can be lost due to the lack of capacity (also known as congestion) in the queue of the router 106. For example, a packet 108 may be lost because the queue in the router 106 is full. Such losses are called congestion errors. Due to the high occupancy level of the queue in the router, the transfer duration of the packet (i.e. the time it takes to transfer the packet) is increased. When there is congestion, the global transmission (called ROTT for Relative One way Trip Time) duration of a packet between the server and the client is usually increased. The wireless network is subject to interference 109. For example, microwaves can pollute the wireless network. In such a case, some packets 110 may be lost. The distance between two losses caused by interference is usually higher than the distance between two losses caused by congestion. However, it is possible that losses caused by interference are also close or even consecutive.

Finally, in FIG. 1, the wireless network is connected via a router 107 to a wired network link 104 and the packets are received by the video client 101. If no protection is used, or if the protection is not sufficient, several video packets in this embodiment will be missing at the video client 101. In other words, a part of the video bitstream is lost, which means that slices (i.e. blocks in a video frame) or NALUs are lost because of the loss of the RTP packets.

To compensate for these losses, it is possible to use error concealment algorithms for reconstructing the missing part of the video as discussed above. However, the reconstruction quality is often poor and auxiliary information is usually necessary for helping the error concealment. It is proposed herein to use a new algorithm that has as an aim to generate a very low quantity of auxiliary information. This low quantity of auxiliary information enables the improvement of the reconstruction quality in comparison to classic error concealment. As this quantity of auxiliary information is very low, its transmission is easy.

Figure 2:
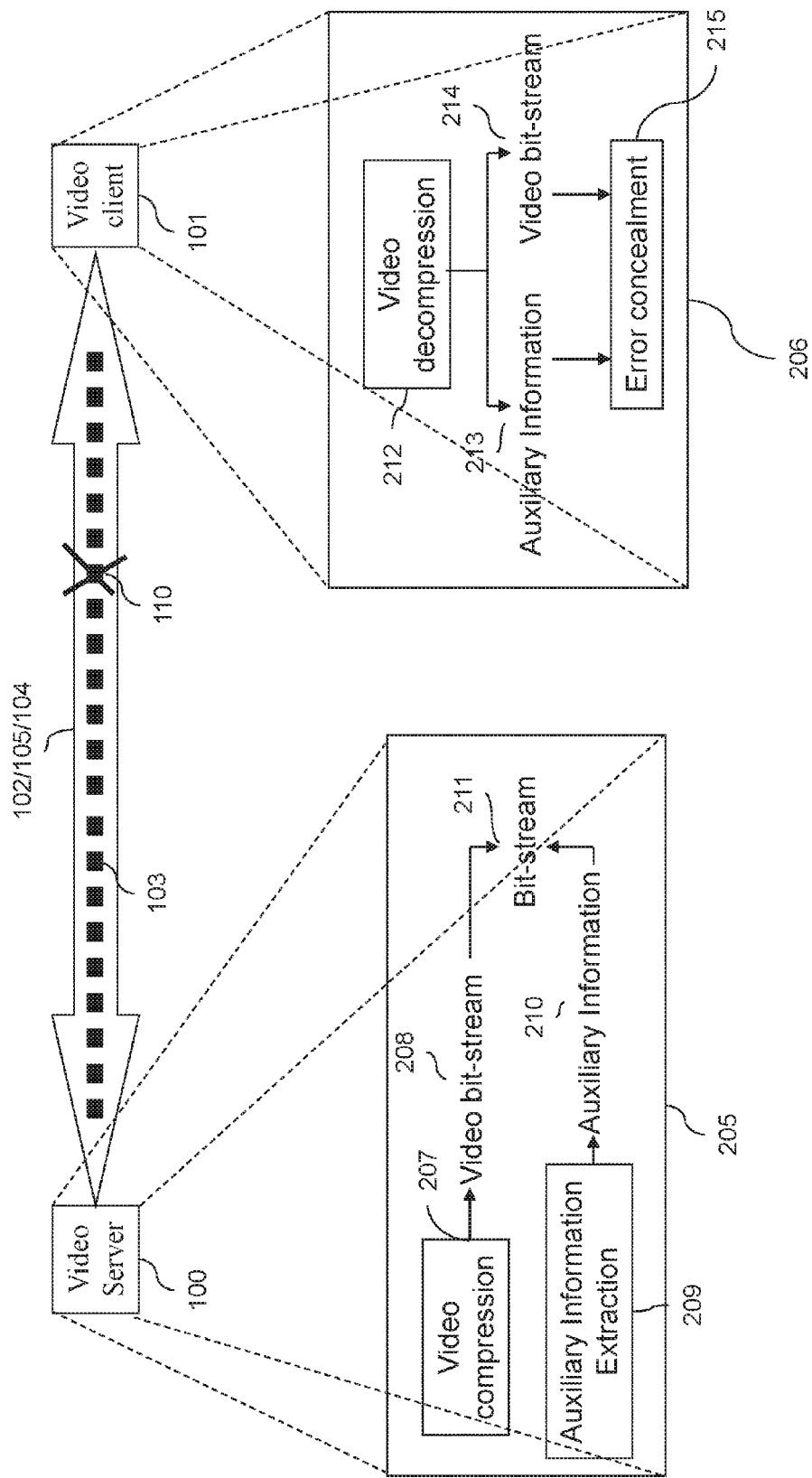
FIG. 2 depicts the architecture of an encoder/decoder system usable with the present invention.

FIG. 2 shows the detail of a context of an embodiment of the present invention. As explained with respect to FIG. 1, the video server 100 transmits video data through a network to a video client 101. The network can be wired or wireless or a combination of wired and wireless. The server 100 sends video data in the form of IP/RTP packets 103 and some packets 110 may be lost.

The main modules of the server 100 are shown schematically in box 205. In a video encoder 207, the video compression (e.g. H.264) algorithm compresses the input video data and generates a video bitstream 208. In parallel, auxiliary information 210 is calculated in an auxiliary information extraction module 209. This auxiliary information 210 is related to the motion information between consecutives frames of the video bitstream. The extracted auxiliary information 210 is merged with the video bitstream 208 to give rise to a final bit-stream 211 that will be transmitted to the client. For example, the auxiliary information is put in an SEI (Supplemental Enhancement Information) of the H.264 or H.264/AVC or other type of bitstream. The SEI is optional information that can be embedded in the bitstream (in the form of a NALU). This information can be ignored by the decoder not aware of the syntax of the SEI. On the other hand, a dedicated video decoder can read this SEI and can extract the auxiliary information as appropriate.

The main modules of the video client 101 are shown in box 206. The video decompression is first triggered in a decoder 212. Assuming, for this module, that the received RTP packets have been successfully received, the video decompression corresponds to the extraction of the different NALUs of the bitstream and the decompression of each NALU. Two kinds of information are extracted:
The auxiliary information 213; and
The video 214 which is not related to the auxiliary information.

If RTP packets have been lost during the video transmission (e.g. packets 110), an error correction algorithm based on the motion auxiliary information is run in an auxiliary information correction module 215.

The embodiments of the present invention are particularly concerned with creating the auxiliary information 210 and 213 in both the video server 100 and in the video client 101. Optimally, the auxiliary information that is transmitted is minimal, but with sufficient information to reconstruct blocks even when information for reconstructing those blocks has been lost in a lost packet. The embodiments of the present invention are also concerned with how the video server and the video client can use an optimal amount of auxiliary information most efficiently to obtain correctly-reconstructed blocks from the successfully-received information. The auxiliary motion information is used for error concealment at the client side in the case of slices being lost during transmission from the server to the client.

The present embodiment can also be used if the video compression module (207) is a video transcoder.

Figure 3:
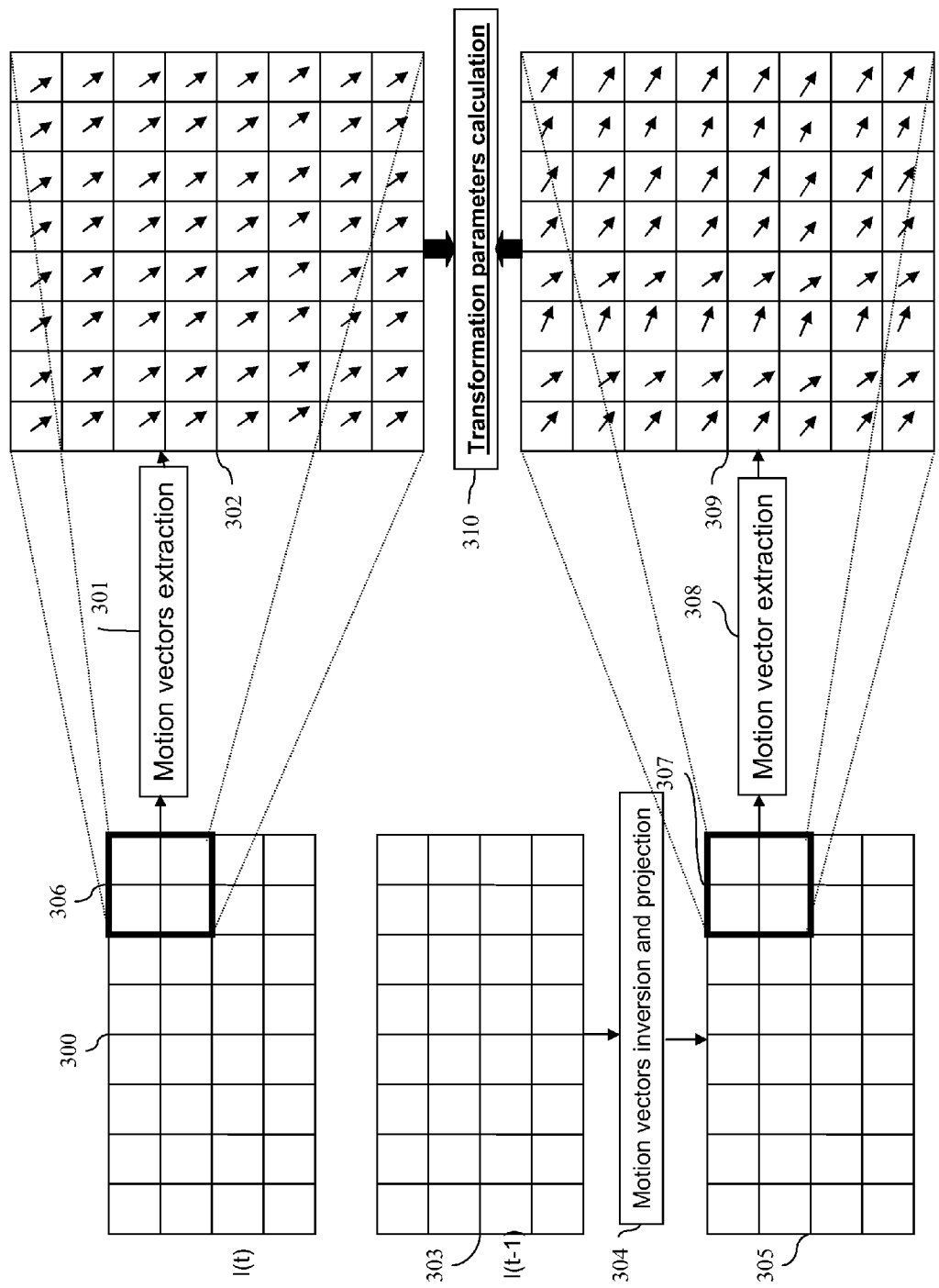
FIG. 3 illustrates the main steps for generating auxiliary information according to embodiments of the present invention.

According to an embodiment of the invention, the encoder 207 in the video server 100 and the decoder 212 in the video client 101 perform the creation and use of the auxiliary information respectively in the following ways as shown in FIG. 3. Specifically, at the encoder 207, the following steps are performed:
Extracting the motion vector field of the current frame I(t);
Extracting the motion vector field of the previous frame I(t−1) and projecting it on the current frame to give an estimated (or "projected") motion vector field of the current frame I(t); and
Calculating transformation parameters between the motion vector field of the current frame I(t) and the estimated motion vector field of the current frame I(t).

These transformation parameters are (included in) the motion auxiliary information transmitted from the server to the client in the SEI message. The three steps listed above are shown in FIG. 3 as discussed below.

The motion vector field 300 of the frame I(t) will be referred to as $\vec{V}(X)$ where X=(m,n) with m the horizontal coordinate of a pixel and n the vertical coordinate of a pixel.

In order to represent the single vector $\vec{V}(X)$ (which is a motion vector) as a motion vector field containing a plurality of motion vectors, it may be supposed that X=(m,n) can take several locations $\vec{V}(X)=\vec{V}(X)_{i=1\ldots N}$ and thus represents a motion vector field, where N is the number of different positions in the image where a motion is determined by the motion estimation process.

This notation of the motion vector field is applicable to the motion vectors extracted for each frame during the video encoding. The process for extracting this motion vector field is illustrated in the FIGS. 5, 6A and 6B and discussed below.

The estimated motion vector field may be referred to as $\vec{ME}(X)$.

The way this estimated motion vector field is obtained is described below with reference to FIG. 7. The estimated motion vector field is preferably calculated according to the error concealment algorithm that is implemented in the video decoder. The aim of the algorithm of the current embodiments is to find (for a given frame at time t) a function T and associated parameters that transform the estimated motion vector field $\vec{ME}(X)$ into a transformed motion vector field at the decoder side that will be referred to as $\vec{W}(X)$ where $\vec{W}(X)=T(\vec{ME}(X))$. The transformation parameters are chosen to minimise the difference between $\vec{V}(X)$ (which is not known at the decoder side in the case of motion vector losses) and $\vec{W}(X)$. In other words, this new transformed motion vector field is preferably as close as possible to the motion vector field (e.g. H.264 motion vector field) $\vec{V}(X)$ such that the motion vector field used for decoding is as close to the original motion vector field as possible and error concealment is as effective as possible.

To compare this with the elements of FIG. 3 (which illustrates the determination of the auxiliary information, or the parameters of the transform T), for instance, 302 is the motion vector field for the current image I(t) and 309 is the first estimated motion vector field of the current image I(t) based on a preceding image I(t−1) only. By comparing the motion vector field 302 and the estimated motion vector field 309, the parameters of the transform T are determined and can be applied to the estimated motion vector field to obtain an estimation that is as close to the actual motion vector field of I(t) as possible. Thus, the estimated motion vector field 309 is equivalent to $\vec{ME}(X)$, which is transformed using T. $\vec{V}(X)$ is the actual motion vector field (not known at the decoder) 302 of the current image that $\vec{W}(X)$ is striving to match.

If the number of parameters of the function T is kept low, these parameters will be more likely to be effectively sent to the decoder that will be able to use them for improving the error concealment. These transformation parameters are the ones that are included in the motion auxiliary information.

In FIG. 3, the current frame I(t) is labelled 300. This frame may be encoded by a H.264 video encoder. This frame 300 is represented in the present example as being composed of 8×4 macroblocks, each being made up of 4×4 blocks, which are in turn each made up of 4×4 pixels. The motion vectors calculated by the video encoder are extracted for this frame by the motion vector extraction module 301. For example, motion vector field 302 contains the motion vectors corresponding to four macroblocks 306. As can be seen, for a group of four macroblocks 306, 64 motion vectors are extracted. The reason for this is that in the example of H.264 encoding, one motion vector is associated to each blocks of 4×4 pixels. Of course, motion vectors may be assigned to any size of block. A block of size 4×4 pixels is simply an example illustrated.

The way that this attribution of one motion vector to each 4×4-pixel block is explained with reference to FIGS. 5, 6A and 6B below.

In parallel to the motion vector field extraction from frame I(t), the frame I(t−1), which preferably precedes I(t) but could be any frame in the same video bitstream, is used and is labelled 303 in FIG. 3. The motion vectors associated with this frame 303 are also extracted. Again, one motion vector for each 4×4-pixel block is extracted by applying the algorithm shown in FIGS. 6A and 6B.

These motion vectors extracted from the second frame 303 are inverted and projected in the inversion and projection modules 304 as described below with reference to FIG. 7. This inversion and projection is an error concealment algorithm also known as motion extrapolation. This error concealment algorithm generates the estimated motion vector field that is also used by the error concealment algorithm at the decoder side. The same error concealment algorithm is preferably used at the encoder and the decoder sides so that the same estimated motion vector field is generated and the same transformation parameters applied to the same estimated motion vector field ME(X) will give rise to the same new motion vector field W(X) that is as close to the actual motion vector field as possible. This error concealed motion vector field is labelled 305 in FIG. 3. Thanks to the same error concealment algorithm being used in both encoding and decoding, this estimated motion vector field can be symmetrically generated both in the video encoder and in the video decoder. In the motion vector extraction module 308, the motion vectors associated with the four macroblocks 307 of the estimated motion vector field 305 are extracted and shown as a complete estimated motion vector field 309 in FIG. 3.

The resulting products of the algorithm shown in FIG. 3 may be summarised as follows:

In 302, the H.264 motion vector field (for four macroblocks) is obtained: $\vec{V}(X)$ In 309, the motion extrapolation field (for four macroblocks) is obtained: $\vec{ME}(X)$ In the transformation parameters calculation module 310, the goal is to calculate the parameters of the transformation T for the four illustrated macroblocks such that $\vec{W}(X)=T(\vec{ME}(X))$ with the parameters of T minimising the distance (for the four macroblocks) between $\vec{V}(X)$ and $\vec{W}(X)$, i.e. the original motion vector field $\vec{V}(X)$ is as close as possible to the transformed motion vector field $\vec{W}(X)$. Finally, when all (eight in the illustrated embodiment) of the groups of four macroblocks have been processed, a set of parameters is obtained. These parameters are used as the motion auxiliary information and can be used by the video decoder for helping the error concealment (as described with reference to FIG. 4 below).

Before turning to discussion of the transformation parameters in more detail, the motion vector extraction process will be described with reference to FIGS. 5 and 6 and the inversion and projection processes will be described with reference to FIG. 7.

Figure 5:
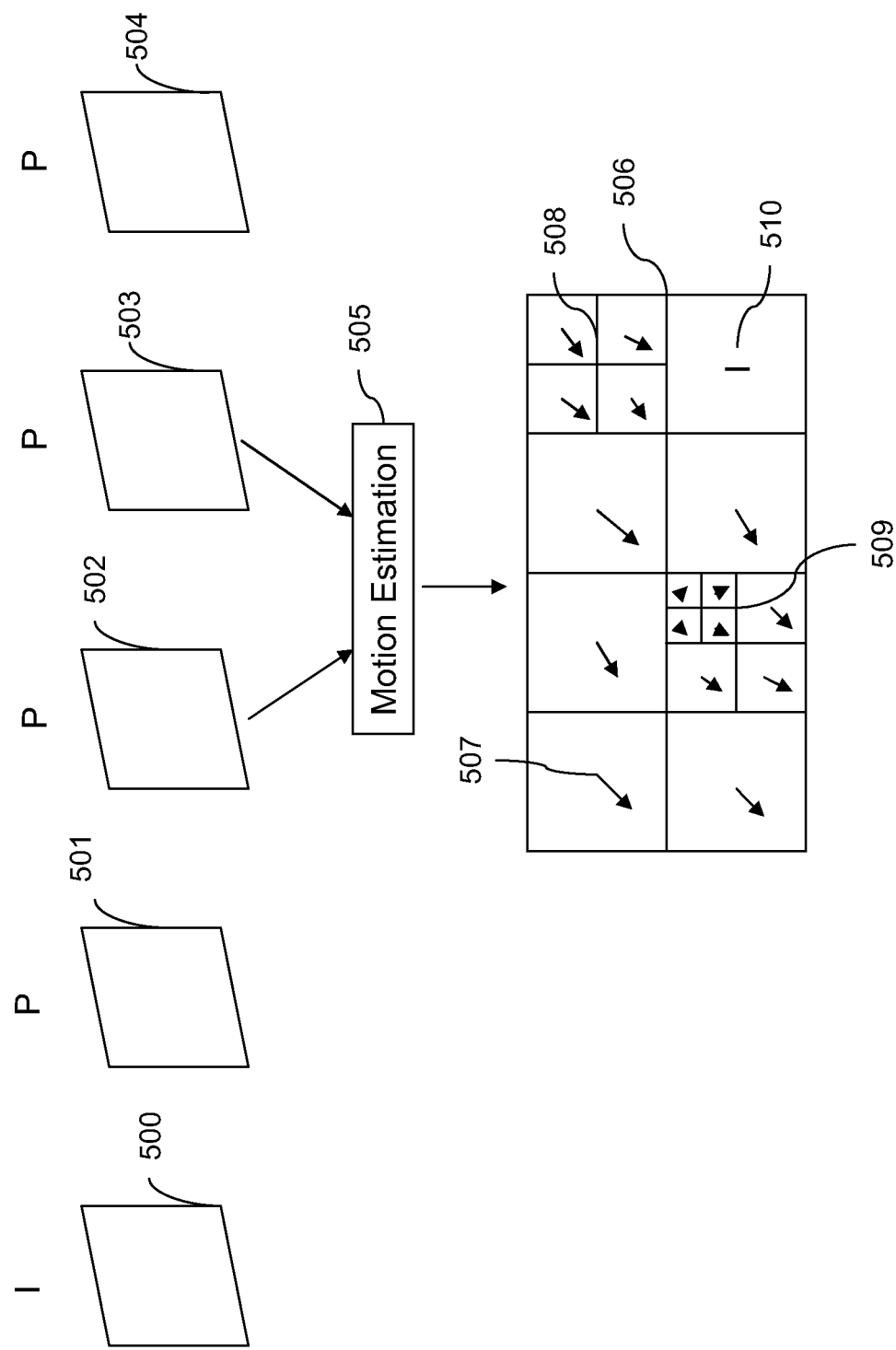
FIG. 5 illustrates a motion estimation process of a video encoder.

FIG. 5 illustrates the motion vector estimation step of a video compression algorithm. Five consecutive frames are shown and labelled 500, 501, 502, 503 and 504. These frames are encoded either as Intra frames (labelled I) in 500 or as Inter frames (labelled P) in 501, 502, 503 and 504. The Intra frame is encoded independently of the other frames whereas the Inter frames are encoded with reference to other frames. It is assumed in this case that the Inter frames are encoded with reference to their respective previous frame. For example, the frame 503 is encoded in reference to the frame 502.

In a motion estimation module 505, the encoder estimates the motion between the frame 503 and the frame 502. The motion estimation algorithm may be a block-matching algorithm. The result of this motion estimation is the motion vector field 506. Specifically, this motion vector field 506 is a symbolic representation of the motion vector field calculated by the motion estimation module 505.

The motion vector field 506 may represent a frame having a size of 64×32 pixels. In the embodiment shown, the frame is composed of 8 macroblocks of 16×16 pixels each. Each of the macroblocks is potentially divisible to create an irregular grid 506.

According to the complexity of the motion between the frames 503 and 502, the macroblocks can be decomposed into a quad-tree with 8×8 pixel blocks and 4×4 pixel blocks. For example, in a first macroblock 507, one motion vector is associated with the 16×16 macroblock. In macroblock 508, one motion vector is associated to each 8×8 block (so there are four motion vectors allocated to the macroblock 508). In macroblock 509, one motion vector is associated to each 4×4 block within one of the 8×8 blocks. A larger number of motion vectors may be allocated to a block or macroblock with more complex motion. If the motion is too complex or the trade-off in terms of rate/distortion optimization is bad, no motion vector is calculated and the macroblock is encoded as an Intra macroblock. Such a case is depicted in macroblock 510.

The motion vector field 506 calculated by the video encoder is a starting point for calculating the motion vector field related to the frame 503. This motion information can be directly obtained during the video compression operation or obtained from a partial decoding of an already-encoded video bitstream.

Auxiliary information is preferably associated to each Inter frame of the video (unless there has been no relative movement between frames). The auxiliary information related to the frame I(t) may be referred to as AI(t). There is no auxiliary information accompanying Intra frames, as these are encoded without motion vectors or residuals.

The beginning of the process for generating the auxiliary information for the frame I(t) is now described with reference to FIG. 6A. Specifically, FIGS. 6A and 6B give more detail about obtaining a motion vector associated to each 4×4-pixel block from a common inter frame (e.g. frame 506 of FIG. 5). The algorithm shown in these figures gives rise to the frames 302 and 309 of FIG. 3 which are used for calculating the transformation parameters. The algorithm also adds the fact that an additional motion inversion and projection is used for first generating the motion vector field 305.

The bitstream of the encoded video is obtained in step 603 and the bitstream corresponding to the frame I(t) is extracted from the bitstream in step 604. From this bitstream, the motion vector information is also extracted in step 605. This motion vector information extraction 605 gives rise to the motion vector field 506 of the frame I(t) shown in FIG. 6B.

In step 606, the motion vector field 506 is extended. This extension consists of attributing a motion vector to each 4×4-pixel block of the motion vector field 506. The extension consists of replicating the motion vector of an 8×8 or 16×16 block or macroblock to the corresponding 4×4 blocks within the larger block or macroblock. For example, all 4×4 blocks within the macroblock 611 will be allocated the same motion vector as macroblock 611. The extension also consists of interpolating the motion vector values to the blocks without motion vectors (e.g. block 610). For example, the missing motion vector information in 610 could be created by replicating the neighbouring motion vector 611 during the interpolation process. The skilled person would understand various ways of interpolating motion vectors for blocks that do not have their own, such as averaging the motion vectors of surrounding blocks, etc. The extension gives rise to the extended motion vector field 601 of FIG. 6B.

At the end of these steps, one motion vector is associated to each 4×4-pixel block of the previous frame I(t−1) (302 in FIG. 3) and of the current frame I(t) (309 of FIG. 3).

Figure 4:
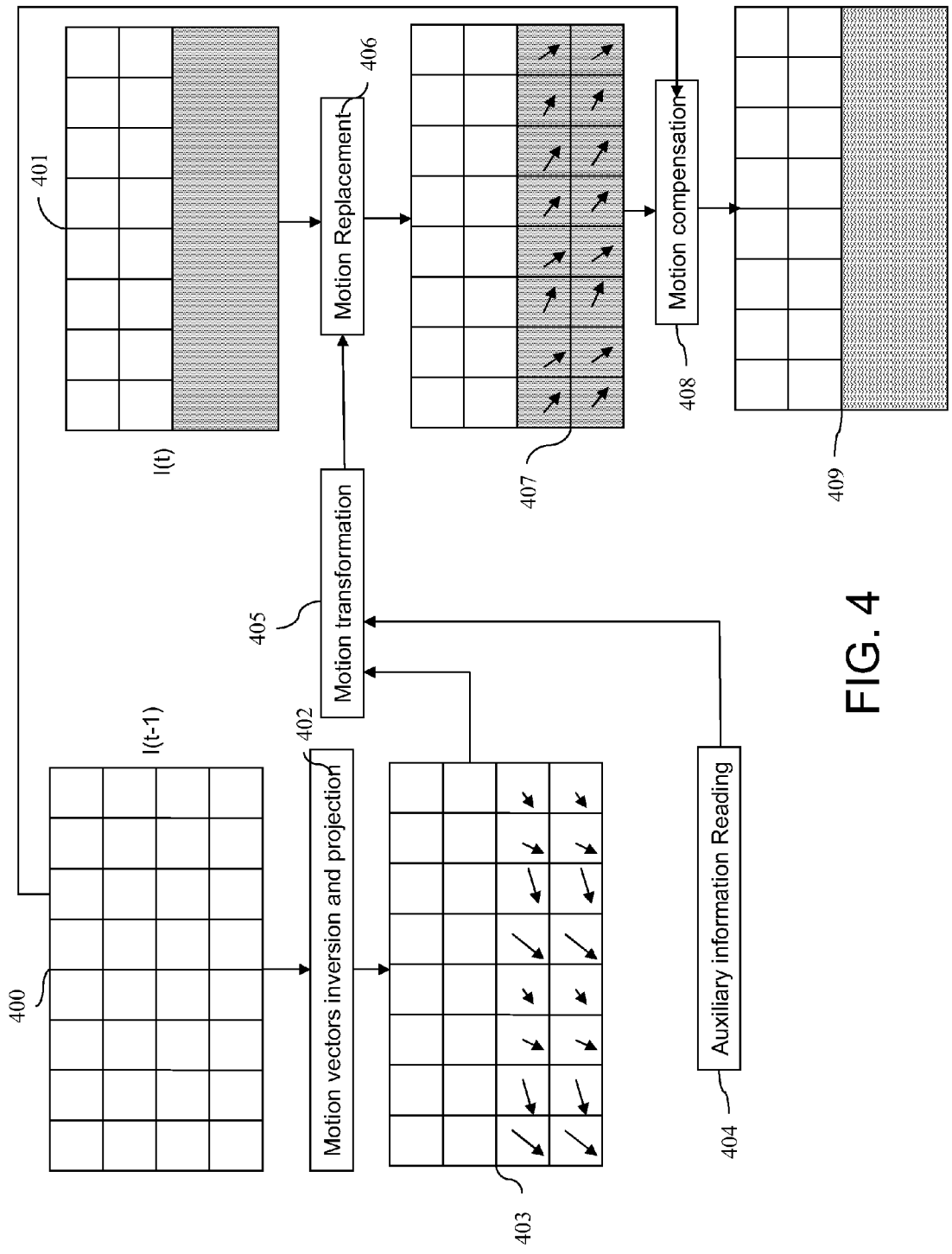
FIG. 4 illustrates a frame reconstruction process at the decoder side according to embodiments of the present invention when lost slices occur.
Figure 7:
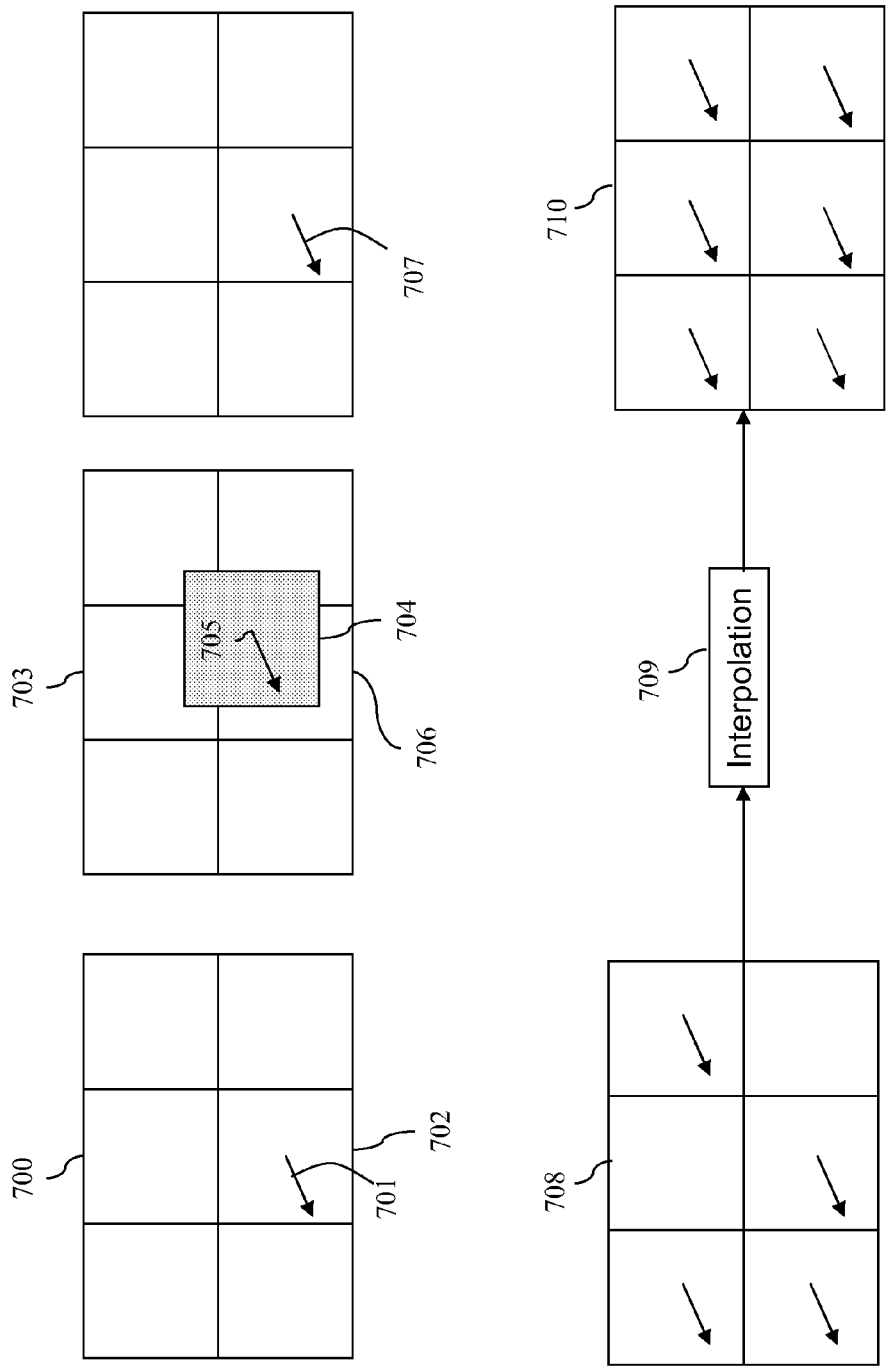
FIG. 7 illustrates a process of generating an estimated motion vector field for a frame at time 't' based on the encoded frame at time 't−1' according to an embodiment of the present invention.

FIG. 7 describes the module 304 of FIG. 3 and the module 402 of FIG. 4. This figure corresponds to the inversion and projection of a motion vector field. It is also known as a motion extrapolation algorithm. This figure describes a basic example of motion extrapolation. Other algorithms could be used, as would be understood by the person skilled in the art. For the present example, a block is taken as having a size of 4×4 pixels. Of course, this algorithm can be used for any size of blocks.

Figures 6A, 6B:
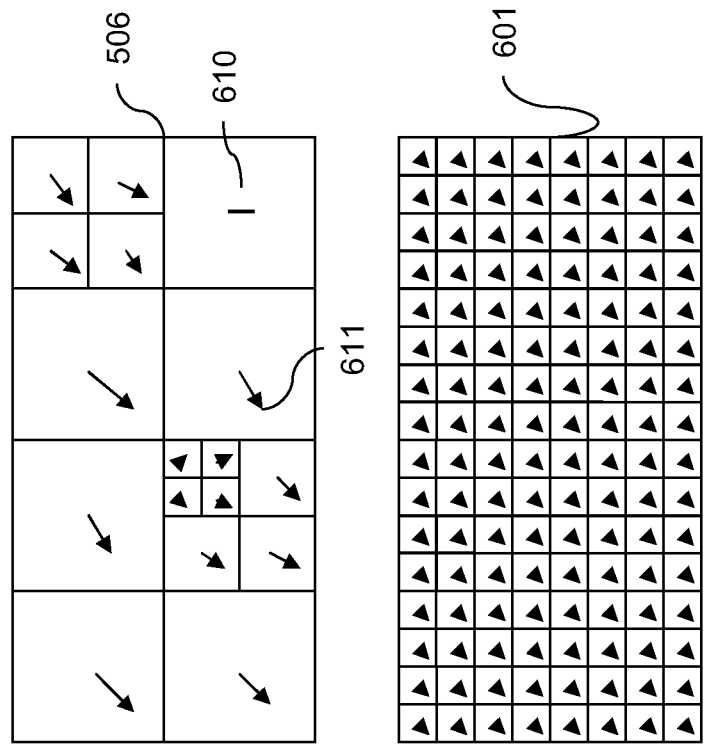
FIGS. 6A and 6B illustrate a motion vector extraction and extension step from the process of generating the motion auxiliary information shown in FIG. 3 and from the process of applying the auxiliary information shown in FIG. 4.

The motion extrapolation process begins, after the process of FIGS. 6A and 6B, with the encoded frame I(t−1) which is labelled 700. Each cell of the frame contains an associated motion vector: for example, the motion vector 701, which can be represented as V(x,y)=(Vx,Vy), is associated with the block 702. The coordinates (x,y) are taken as being the centre of the block 702.

This motion vector 701 is inverted, giving: −V(x,y)= (−Vx, −Vy). Following the direction of the inverted vector thus gives the equivalent position of the block in the subsequent frame I(t) that is equivalent to the block 702 in frame I(t−1). The block 702 is thus projected onto the frame I(t) 703 according to this inverted motion vector 705 and results in block 704. The centre of block 704 in frame I(t) is at the position represented by (x−Vx, y−Vy).

The value of the motion vector 705 associated with this block 704 is the same value as the original uninverted motion vector, namely V(x,y)=(Vx,Vy).

As can be seen from frame I(t) labelled 703, the inversion-produced block 704 shares the largest common area with the cell 706 from among all the cells of the frame I(t). Thus, the value of the motion vector V(x,y) 705 is attributed to the cell 706 as depicted in the resultant frame 707. The same inversion and projection process is repeated for all the cells of the frame I(t−1). An example of the result of this process is shown in frame 708. After this first process, some cells have no corresponding motion vectors because the motion vector inversion process has not led to a majority overlap of the inversion-produced block with those cells. An interpolation stage 709 may thus be conducted to enable the obtaining of a full motion vector field 710 for the frame I(t).

The interpolation may be performed in a similar way to the interpolation described above with respect to the motion vector extension 606 shown in FIGS. 6A and 6B.

The processes at the decoder side will now be described. FIG. 4 illustrates the reconstruction that is performed at the decoder side, the reconstruction of the motion vector field of the current frame being enabled by the use of the motion auxiliary information if a part of the current frame is lost during transmission from the encoder.

In this figure, the current frame I(t) 401 is received by the decoder but the shaded bottom half of this frame is considered as lost. A second frame (I(t−1), 400) will be used to generate an estimated motion vector field for the current frame I'(t). The second frame will be the same frame that was used by the encoder to produce the estimated motion vector field 309 and so will be the immediately previous frame in the present example.

From this previous frame I(t−1) 400, a motion vector inversion and projection module 402 performs the inversion and projection processes (discussed above with reference to FIG. 7) to generate an estimated motion vector field 403. This inversion and projection algorithm is preferably the same as the one used in the module 304 of FIG. 3. This algorithm enables the decoder to obtain an estimated motion vector field for the whole frame I(t) including the lost part of the frame.

Next, the motion auxiliary information is read by the decoder in step 404 and the estimated motion vector field 403 generated by the motion extrapolation (i.e. the inversion and projection) is transformed in the motion transformation module 405 using the read transformation parameters.

The transformed motion vector field is used in the motion replacement module 406 for replacing the motion vector field at the location in the current frame I(t) of the lost slice. The result is a motion vector field 407 attributed to the lost slice that can be used in a motion compensation process in the motion compensation module 408 which gives rise to an error concealed frame 409.

Figure 8:
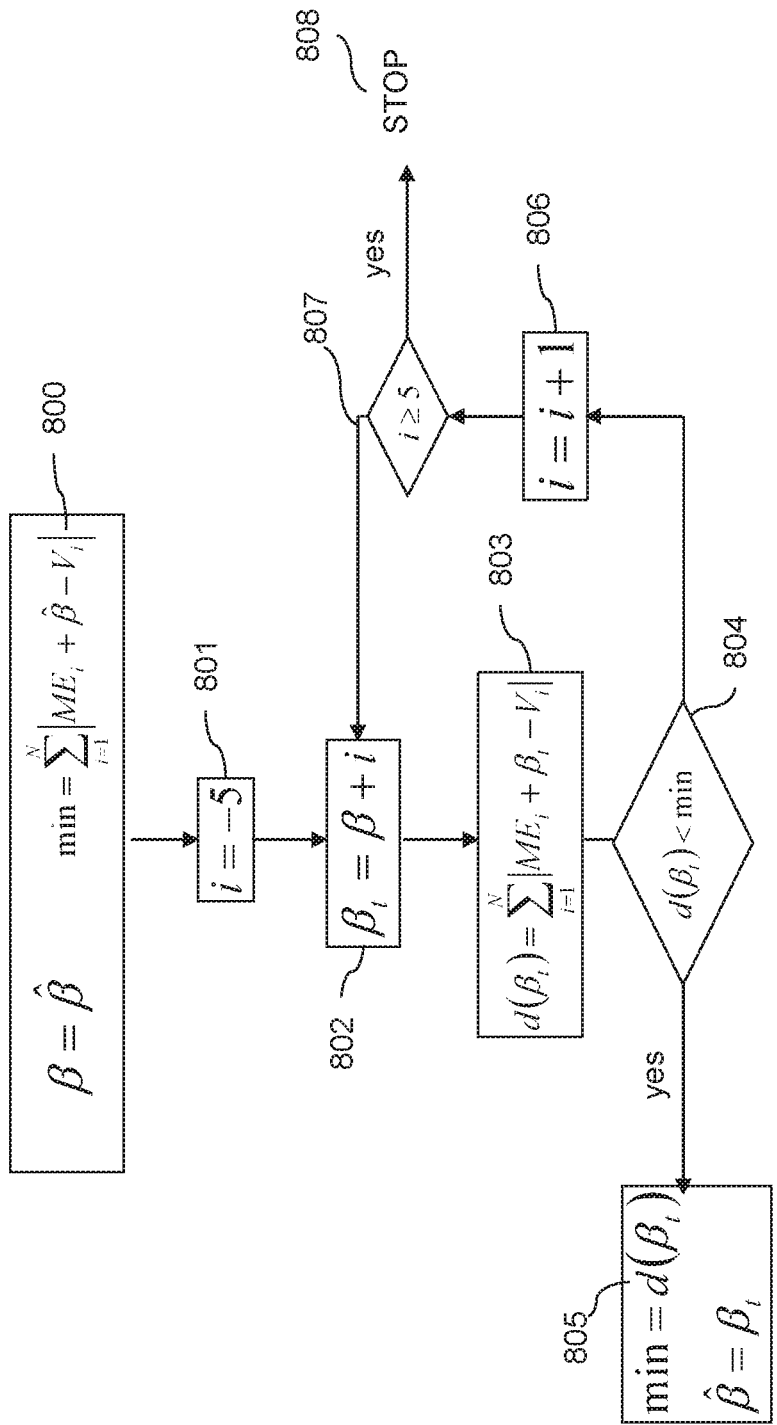
FIG. 8 illustrates the process of optimizing a parameter β according to an embodiment of the invention.
Figure 9:
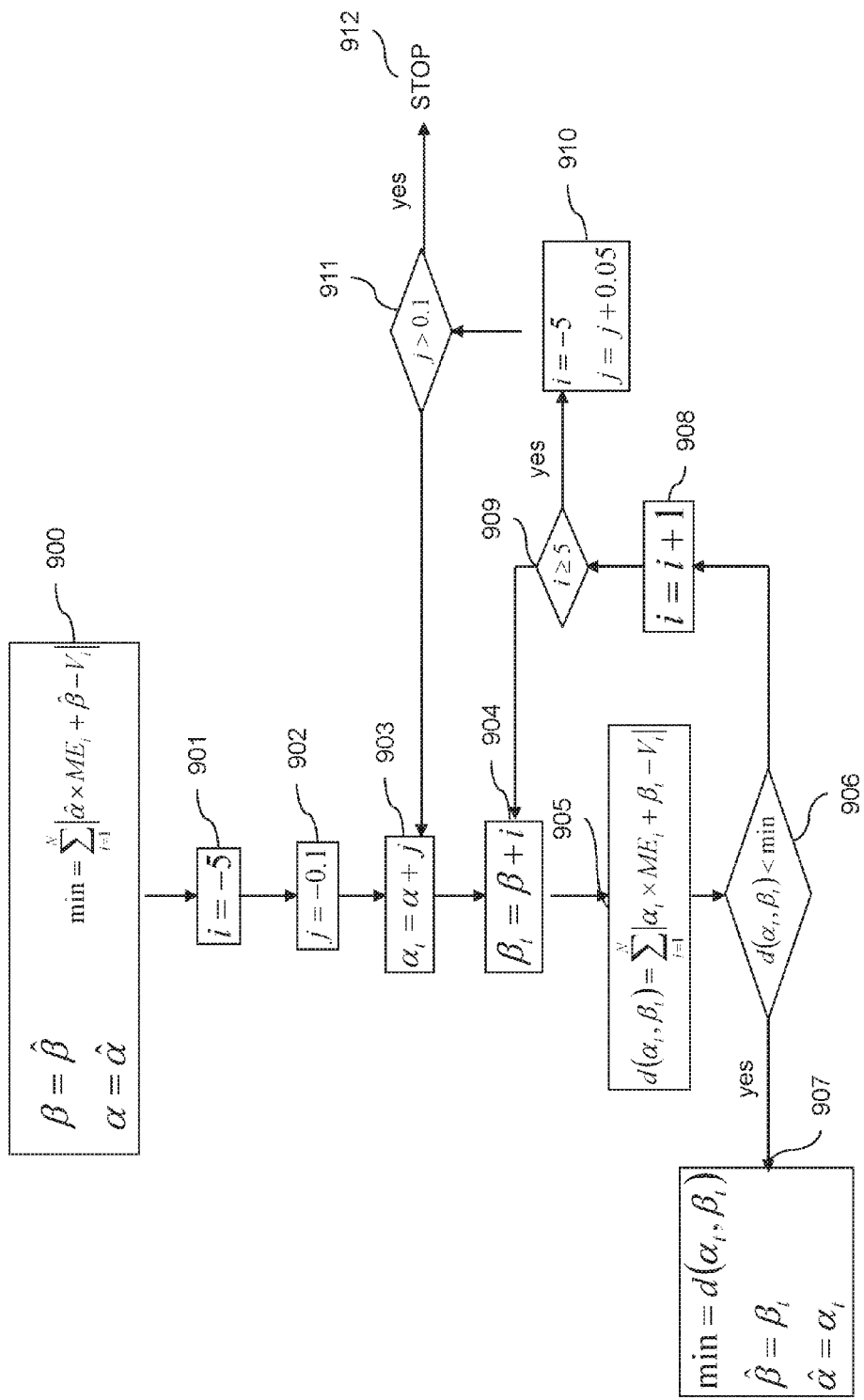
FIG. 9 illustrates the process of optimizing parameters α and β according to an embodiment of the invention.
Figure 10:
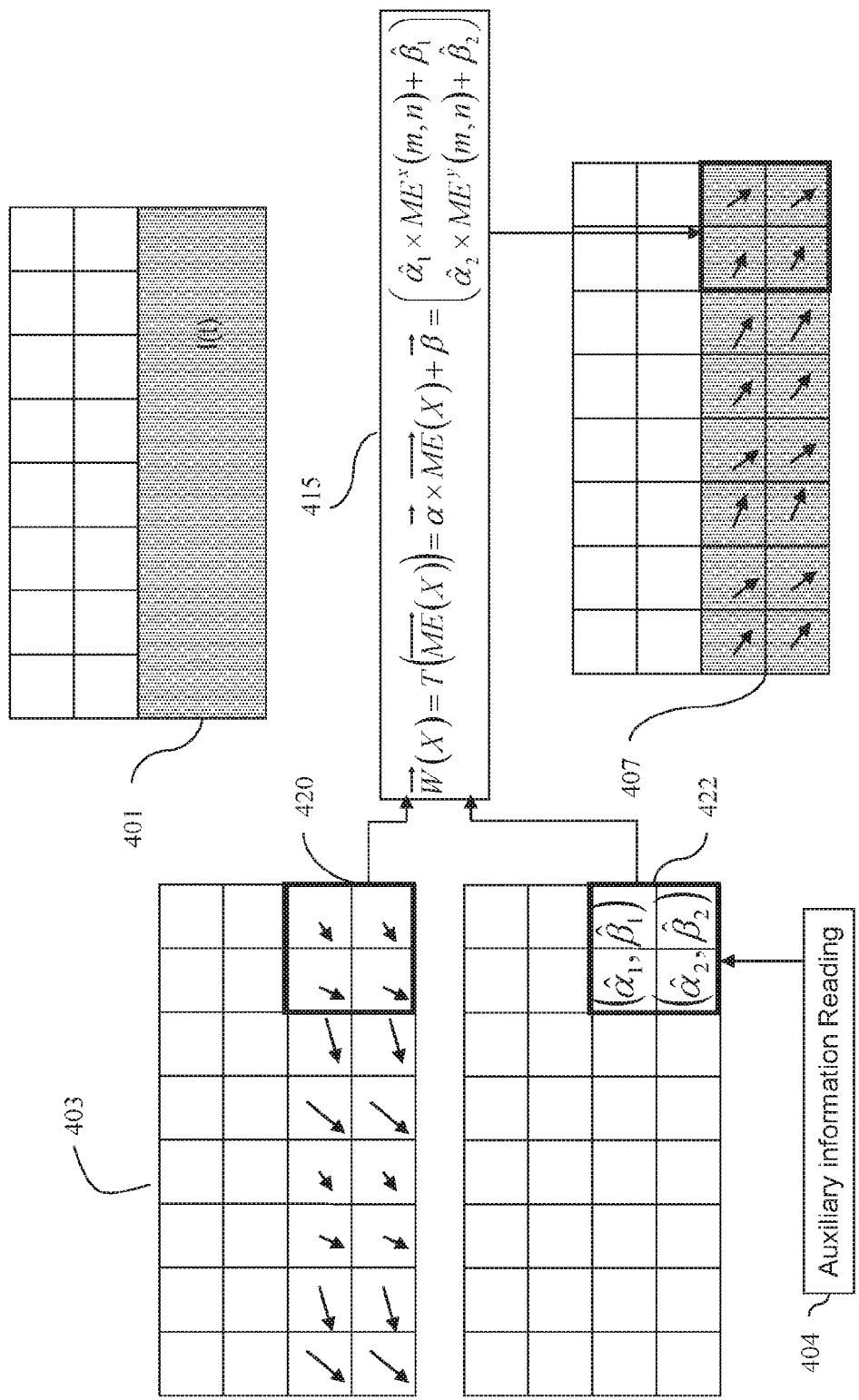
FIG. 10 illustrates motion vector reconstruction process of FIG. 4 in more detail.

Further details of the modules 403, 404 and 405 are given in conjunction with FIG. 10. The frame I(t) 401 received by the decoder is subject to one lost slice (illustrated by the shaded rectangle). The goal is to improve the common motion extrapolation by using the motion auxiliary information. The motion extrapolation algorithm has been run and generates an estimated motion vector field 403. The group of four motion vectors 420 may be specifically considered. Motion auxiliary information has been calculated by the encoder for the four motion vectors of this group (in module 310 of FIG. 3). The corresponding auxiliary information is read by the decoder in the auxiliary information reading module 404 from the SEI and results in the parameters 422, the derivation of which will be described below with reference to FIGS. 8 and 9. These parameters are used in conjunction with the motion vectors of the block 420 in the motion replacement module 415. The results are new (and better) motion vectors that are put at the correct locations in frame 407. These new motion vectors can be used for motion compensation in the motion compensation module 408 of FIG. 4.

The transformation parameters will now be discussed in detail.

Several kinds of transformations T can be used. The transformation parameters link two motion vector fields together and may take several forms, including polynomial functions representing motion vectors.

According to preferred embodiments, two main transformations are used:
    The constant transformation
    The linear transformation These two transformations are detailed in the next subsections. In particular, these two next sub-sections explain how the transformation parameters are extracted at the encoder.

Constant transformation

According to a first embodiment, a given block (or macroblock) may have N motion vectors. These N motion vectors correspond to, for example, 16 motion vectors of each 4×4 macroblock shown in the frames 302 and 309 of FIG. 3.

The transformation T of an estimated motion vector of the block 309 (this vector is called ME(X)) into a new vector at the same location (called W(X)) is defined by:

$$\vec{W}(X) = T(\vec{ME}(X)) = \vec{ME}(X) + \vec{\beta} = \begin{pmatrix} ME^x(m,n) + \beta_1 \\ ME^y(m,n) + \beta_2 \end{pmatrix}$$

For a given set of N motion vectors (N=16 in the FIG. 3), $\vec{V}(X)$ and $\vec{ME}(X)$, the goal is to find the parameters that minimise the following equality:

$$d = \sum_{i=1}^{N} \|\vec{W_i}(X) - \vec{V_i}(X)\| = \sum_{i=1}^{N} \|T(\vec{ME_i}(X)) - \vec{V_i}(X)\|$$

If the norm $L_2$ is used, d (a sum of errors) can be written as:

$$d = d(\beta_1, \beta_2) = \sum_{i=1}^{N} (ME_i^x + \beta_1 - V_i^x)^2 + (ME_i^y + \beta_2 - V_i^y)^2$$

This function d can be split into 2 independent terms:

$$d = d_1(\beta_1) + d_2(\beta_2) = \sum_{i=1}^{N} (ME_i^x + \beta_1 - V_i^x)^2 + \sum_{i=1}^{N} (ME_i^y + \beta_2 - V_i^y)^2$$

As these two functions are independent, they can be minimised independently. The goal is therefore to find the parameters ($\beta_k$) that minimize $d_k(\beta_k)$ wherein k take the value 1 or 2. For a question of simplicity, the index k will be removed in the following. However, the optimisation will be conducted both on $d_1(\beta_1)$ and $d_2(\beta_2)$. The goal is therefore to find the parameter ($\beta$) that minimizes d($\beta$):

$$d(\beta) = \sum_{i=1}^{N} (ME_i + \beta - V_i)^2$$

The first derivative is calculated:

$$\frac{\partial d}{\partial \beta}(\beta) = \sum_{i=1}^{N} \frac{\partial (ME_i + \beta - V_i)^2}{\partial \beta} = \sum_{i=1}^{N} 2(ME_i + \beta - V_i)$$

$$\frac{\partial d}{\partial \beta}(\beta) = 2\sum_{i=1}^{N} ME_i + 2N\beta - 2\sum_{i=1}^{N} V_i$$

The critical point of the function d($\beta$) is defined by:

$$\frac{\partial d}{\partial B}(\beta) = 0 \text{ which can be written as: } \sum_{i=1}^{N} ME_i + N\beta - \sum_{i=1}^{N} V_i = 0$$

The solution is:

$$\hat{\beta} = \frac{1}{N}\left(\sum_{i=1}^{N} V_i - \sum_{i=1}^{N} ME_i\right)$$

This value $\hat{\beta}$ is extended to the two dimensions of the motion vectors: $\hat{\beta}=(\hat{\beta}_x,\hat{\beta}_y)$. This parameter is calculated for each set of N motion vectors. For each set of N motion vectors, there are two values of $\hat{\beta}$. A set of N motion vectors corresponds to a set of motion vectors associated to a given number of macroblocks (4 macroblocks in the example of the FIG. 3).

The inventors have noticed in experiments that the minimization of the $L_2$ norm does not always give the best results. The $L_1$ norm may be better in certain circumstances; and the convergence of the N motion extrapolation vectors toward the N H.264 motion vectors gives rise to an improvement of the error concealment quality only if the N transformed motion vectors are 'close' to the N H.264 motion vectors.

The parameter $\hat{\beta}$ is therefore optimized in a second step. This second step is described with reference to FIG. 8. This algorithm consists of searching the adjacent values $\hat{\beta}$ that minimise the $L_1$ distance. The motion side information of the four macroblocks (306 in FIG. 3) corresponds to the horizontal and vertical parameters $\hat{\beta}$. For the whole frame I(t), the parameters $\hat{\beta}$ are calculated for all the groups of four adjacent macroblocks of the frame. Of course, the invention is not restricted to four macroblocks and any value can be taken.

Linear transformation

Again, a given block (or macroblock) may have N motion vectors. These N motion vectors correspond to the blocks 302 and 309 of FIG. 3. The transformation T of a vector of the block 309 (this vector is called ME(X)) into a new vector at the same location (called W(X)) is defined by:

$$\vec{W}(X) = T(\vec{ME}(X)) = \vec{\alpha} \times \vec{ME}(X) + \vec{\beta} = \begin{pmatrix} \alpha_1 \times ME^x(m,n) + \beta_1 \\ \alpha_2 \times ME^y(m,n) + \beta_2 \end{pmatrix}$$

As in the constant transformation example, for a given set of N motion vectors $\vec{V}(X)$ and $\vec{ME}(X)$, the goal is to find the parameters that minimise the following equality:

$$d = \sum_{i=1}^{N} \|\vec{W_i}(X) - \vec{V_i}(X)\| = \sum_{i=1}^{N} \|T(\vec{ME_i}(X)) - \vec{V_i}(X)\|$$

$$d =$$

$$d(\alpha_1, \alpha_2, \beta_1, \beta_2) = \sum_{i=1}^{N} (\alpha_1 \times ME_i^x + \beta_1 - V_1^x)^2 + (\alpha_2 \times ME_i^y + \beta_2 - V_i^y)^2$$

This function d can be split into 2 independent terms:

$$d = d_1(\alpha_1, \beta_1) + d_2(\alpha_2, \beta_2) =$$

$$\sum_{i=1}^{N} (\alpha_1 \times ME_i^x + \beta_1 - V_i^x)^2 + \sum_{i=1}^{N} +(\alpha_2 \times ME_i^y + \beta_2 - V_i^y)^2$$

As these two functions are independent, they can be minimised independently. The goal is therefore to find the parameters $(\alpha_k, \beta_k)$ that minimise $d_k(\alpha_k, \beta_k)$ wherein k takes the value 1 or 2. For a question of simplicity, the index k will be removed in the following. However, the optimization will be conducted on $d_1(\alpha_1,\beta_1)$ and $d_2(\alpha_2,\beta_2)$. The goal is therefore to find the parameters $(\alpha,\beta)$ that minimise $d(\alpha,\beta)$:

$$d(\alpha, \beta) = \sum_{i=1}^{N} (\alpha \times ME_i + \beta - V_i)^2$$

The first derivatives are calculated:

$$\frac{\partial d}{\partial \alpha}(\alpha, \beta) = \sum_{i=1}^{N} \frac{\partial(\alpha \times ME_i + \beta - V_i)^2}{\partial \alpha} = \sum_{i=1}^{N} 2(\alpha \times ME_i + \beta - V_i) \times ME_i$$

$$\frac{\partial d}{\partial \alpha}(\alpha, \beta) = 2\alpha \sum_{i=1}^{N} ME_i^2 + 2\beta \sum_{i=1}^{N} ME_i - 2\sum_{i=1}^{N} ME_i \times V_i$$

$$\frac{\partial d}{\partial \beta}(\alpha, \beta) = \sum_{i=1}^{N} \frac{\partial(\alpha \times ME_i + \beta - V_i)^2}{\partial \beta} = \sum_{i=1}^{N} 2(\alpha \times ME_i + \beta - V_i)$$

$$\frac{\partial d}{\partial \beta}(\alpha, \beta) = 2\alpha \sum_{i=1}^{N} ME_i + 2N\beta - 2\sum_{i=1}^{N} V_i$$

The critical points of the function $d(\alpha,\beta)$ are defined by:

$$\frac{\partial d}{\partial \alpha}(\alpha, \beta) = 0$$

$$\frac{\partial d}{\partial \beta}(\alpha, \beta) = 0$$

which can be written as:

$$\alpha \sum_{i=1}^{N} ME_i^2 + \beta \sum_{i=1}^{N} ME_i - \sum_{i=1}^{N} ME_i \times V_i = 0$$

$$\alpha \sum_{i=1}^{N} ME_i + N\beta - \sum_{i=1}^{N} V_i = 0$$

By introducing the variables:

$$A = \sum_{i=1}^{N} ME_i^2, B = \sum_{i=1}^{N} ME_i, C = \sum_{i=1}^{N} ME_i \cdot V_i, D = \sum_{i=1}^{N} V_i,$$

the following equation system can be solved:

$$\alpha A + \beta B - C = 0$$

$$\alpha B + N\beta - D = 0$$

The solution is:

$$\hat{\alpha} = \frac{\frac{CN}{B} - D}{\frac{AN}{B} - B} \text{ and } \hat{\beta} = \frac{\frac{BC}{A} - D}{\frac{B^2}{A} - N}$$

This solution corresponds to the minimum of $d(\alpha,\beta)$ if: $\Delta > 0$ and $W > 0$ wherein the definitions of $\Delta$ and W are given by:

$$W = \frac{\partial^2 d}{\partial \alpha^2}(\hat{\alpha}, \hat{\beta}), X = \frac{\partial^2 d}{\partial \alpha . \partial \beta}(\hat{\alpha}, \hat{\beta}), Y = \frac{\partial^2 d}{\partial \beta^2}(\hat{\alpha}, \hat{\beta}) \text{ and}$$

$$\Delta = W.Y - X^2$$

$$W = \frac{\partial^2 d}{\partial \alpha^2}(\hat{\alpha}, \hat{\beta}) = 2\sum_{i=1}^{N} ME_i^2$$

$$X = \frac{\partial^2 d}{\partial \alpha . \partial \beta}(\hat{\alpha}, \hat{\beta}) = 2\sum_{i=1}^{N} ME_i$$

$$Y = \frac{\partial^2 d}{\partial \beta^2}(\hat{\alpha}, \hat{\beta}) = 2N$$

In the case where $W > 0$, the calculated values correspond to a minimum if $$\Delta = 4N \sum_{i=1}^{N} ME_i^2 - 4\left(\sum_{i=1}^{N} ME_i\right)^2$$

is positive.

These calculations using the $L_2$ norm can be transformed to use the $L_1$ norm. The corresponding algorithm is described with reference to FIG. 9. This algorithm consists of optimizing the value $\alpha$ and $\beta$ based on the initial values $\hat{\alpha}\hat{\beta}$. The couple $(\alpha,\beta)$ that minimises the $L_1$ norm is kept as the optimum parameter. The motion auxiliary information of the four macroblocks 306 corresponds to the horizontal and vertical parameters $(\hat{\alpha},\hat{\beta})$. For the whole frame I(t), the parameters $(\hat{\alpha},\hat{\beta})$ are calculated for all the groups of four adjacent macroblocks of the frame. Of course, the invention is not restricted to four macroblocks and any value can be taken.

As mentioned above, FIG. 8 illustrates how to optimise the parameter $\beta$ calculated by the algorithm based on a constant transformation model. This algorithm is described with reference to FIG. 4. The parameter calculated according to the $L_2$ norm is preferably optimised for the $L_1$ norm.

In step 800, several values are initialised. $\hat{\beta}$ is the value obtained at the end of the $L_2$ optimization described with reference to the FIG. 4. "min" is the $L_1$ distance between the N motion vectors, $ME_i + \hat{\beta}$, and the N motion vectors of the frame I(t): $V_i$. The value $\beta$ is initialized with $\hat{\beta}$. In step 801, the variable i is set to −5. In step 802, the variable $\beta_t = \beta + i$ is calculated. This new parameter will be tested with the $L_1$ distance in step 803, resulting in the value $d(\beta_t)$. If $d(\beta_t)$ is lower than min in step 804 (yes), it means that $\beta_t = \beta + i$ is a better parameter (for the $L_1$ distance) than the previous parameter $\hat{\beta}$. In such a case, the new optimal values are recorded in step 805. Whatever the decision output in step 804, the value i is incremented by 1 in step 806 for testing, with the $L_1$ distance given a new value $\beta_t$ in step 802. If in step 807, the variable i is too high (yes), the optimization process stops in step 808.

FIG. 9 illustrates how to optimise the parameters $\alpha$ and $\beta$ calculated by the algorithm based on a linear transformation model described above. The algorithm consists of calculating a given set of couples $(\alpha,\beta)$ with the $L_1$ distance and in selecting the couple that minimises this distance. The initial values of $(\alpha,\beta)$ are given by the result $(\hat{\alpha},\hat{\beta})$ of the $L_2$ optimization. In step 900, the values $\alpha$ and $\beta$ are initialised with $(\hat{\alpha},\hat{\beta})$. The $L_1$ distance with these variables is calculated and called min. In step 901, the variable i enabling the test of difference values of $\beta$ is initialised. In step 902, the variable j enabling the test of difference values of $\alpha$ is initialised. In steps 903 and 904, a new couple of test values $(\alpha_t,\beta_t)$ are set (increased by j and i respectively) and the $L_1$ distance is calculated according to the linear transformation in step 905. If the resulting distance $d(\alpha_t,\beta_t)$ is lower than min (yes), the new couple of value $(\alpha_t,\beta_t)$ is kept as the new optimal value in step 907. The process of testing different couples $(\alpha_t,\beta_t)$ by changing their values as shown in FIG. 9 continues through the steps 908, 909 (yes), 910 and 911. When all the possible values have been tested the algorithm stops (yes) in step 912 and the optimal values recorded in step 907 are kept as motion auxiliary information for the current four macroblocks.

According to a preferred embodiment of the invention, the auxiliary information may have a fixed budget or threshold of bandwidth to be allocated to motion vectors. Thus, the number of motion vectors, and therefore the format of the motion parameters, may be tailored (i.e. limited) to this budget. The same budget is given to both the encoder and the decoder so that the same motion vector field is generated.

Figure 11:
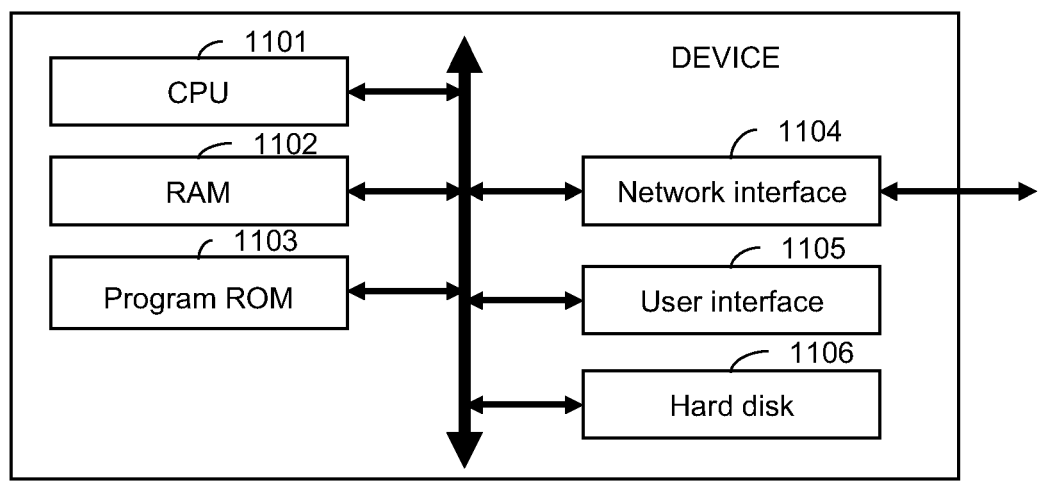
FIG. 11 illustrates a device for implementing a method of processing a coded data stream in accordance with an embodiment of the invention.

FIG. 11 illustrates a block diagram of a device server (encoder) or client (decoder) adapted to incorporate the invention. Preferably, the device comprises a central processing unit (CPU) 1101 capable of executing instructions from a program ROM (read-only memory) 1103 on powering up of the device, and instructions relating to a software application from main memory 1102 after the powering up. The main memory 1102 is for example a Random Access Memory (RAM) which functions as a working area of the CPU 1101, and the memory capacity thereof can be expanded by an optional RAM connected to an expansion port (not illustrated). Instructions relating to the software application may be loaded to the main memory 1102 from the hard disk (HD) 1106 or the program ROM 1103 for example. Such a software application, when executed by the CPU 1101, causes the steps described above (on either the server or client sides) to be performed. Reference numeral 1104 is a network interface that allows the connection of the device to the communication network. The software application when executed by the CPU is adapted to receive data streams through the network interface from other devices. Reference numeral 1105 represents a user interface to display information to, and/or receive inputs from, a user. Thus, the methods and processes above may be performed by a device such as that shown in FIG. 11.

The skilled person may be able to think of other applications, modifications and improvements that may be applicable to the above-described embodiment. The present invention is not limited to the embodiments described above, but extends to all modifications falling within the scope of the appended claims.

The invention claimed is:

1. An encoder device for encoding a first frame and a second frame of a video bit stream, each frame of the video bit stream being defined by a plurality of blocks of pixels, the encoder device comprising a central processing unit (CPU) and a memory, storing computer-executable instructions:
   the CPU being configured to extract a motion vector field containing a plurality of motion vectors of the first frame;
   the CPU being configured to extract a motion vector field containing a plurality of motion vectors of the second frame that precedes or follows the first frame;
   the CPU being configured to determine an estimated motion vector field of the first frame by projecting the extracted motion vector field of the second frame to the first frame;
   the CPU being configured to determine a difference between the motion vector field of the first frame and the estimated motion vector field of the first frame, and to generate a parameter based on the determined difference; and
   the CPU being configured to transmit the generated parameter and the motion vector field of the first frame to a decoder wherein the generated parameter can be used by the decoder to obtain an enhanced estimate of a motion vector of the first frame that is not received by the decoder by applying a motion transformation to the estimated motion vector field of the first frame.

2. An encoder device according to claim 1, wherein the encoder device is caused to determine an estimated motion vector field of the first frame by projecting the second motion vector field of the second frame to the first frame by obtaining motion vectors for each of a plurality of blocks of the second frame;
   inverting the motion vectors for each of the plurality of blocks of the second frame, wherein the inverting comprises multiplying the motion vectors by −1;
   associating blocks of the second frame with blocks of the first frame using the inverted motion vectors; and
   assigning each respective motion vector for each block of the second frame to each respective block of the first frame with which the respective motion vector is associated to generate an estimated motion vector field for the first frame.

3. An encoder device according to claim 2, wherein the encoder device is caused to associate blocks of the second frame with blocks of the first frame using the inverted motion vectors by:
   projecting each block from the second frame onto the first frame using the inverted motion vectors; and
   determining with which block of the first frame each projected block shares the largest common area, and assigning each respective motion vector for each block of the second frame to each respective associated block in the first frame with which each respective projected block shares the largest common area such that each block with which a projected block shares the largest common area is assigned a motion vector.

4. An encoding method of encoding a first frame and a second frame of a video bit stream, each frame of the video bit stream being defined by a plurality of blocks of pixels, the method comprising:
   extracting a first motion vector field containing a plurality of motion vectors of the first frame, the first motion vector field consisting of motion vectors relating to a plurality of macroblocks of the first frame, which macroblocks each contain a plurality of blocks, each block having an associated motion vector;

extracting a second motion vector field containing a plurality of motion vectors of the second frame that precedes or follows the first frame, the second motion vector field consisting of a motion vectors relating to a plurality of macroblocks of the second frame, which macroblocks each contain a plurality of blocks, each block having an associated motion vector;

determining an estimated motion vector field of the first frame by projecting the extracted second motion vector field of the second frame to the first frame;

generating at least one transformation parameter that represents a single motion transformation that when applied to each of the plurality of motion vectors of the estimated motion vector field generates a motion vector field that is similar to or the same as the first motion vector field of the first frame; and transmitting the generated transformation parameter and the motion vector field of the first frame to a decoder wherein the generated parameter can be used by the decoder, if a part of the first frame is not received by the decoder, to obtain an enhanced estimate of a motion vector of the first frame relating to the part of the frame that is not received by the decoder by applying the single motion transformation to the estimated motion vector field of the first frame.

\* \* \* \* \*